United States Patent [19]

Kodal et al.

[11] 4,448,265

[45] May 15, 1984

[54] ELECTRICAL COMPONENT MEMBER WHICH IS MOUNTED IN A HOUSING CENTERED AND ADJUSTED

[75] Inventors: Tassilo Kodal, Oppersdorf; Hubert Kraus, Regensburg, both of Fed. Rep. of Germany

[73] Assignee: Siemens Aktiengesellschaft, Berlin and Münich, Fed. Rep. of Germany

[21] Appl. No.: 357,658

[22] Filed: Mar. 12, 1982

[30] Foreign Application Priority Data

Aug. 14, 1981 [DE] Fed. Rep. of Germany ....... 3132243

[51] Int. Cl.$^3$ .............................................. H05K 5/06
[52] U.S. Cl. ........................... 174/52 PE; 264/272.15
[58] Field of Search .............. 174/52 PE; 264/272.15, 264/272.18, 275; 29/841, 855, 856

[56] References Cited

U.S. PATENT DOCUMENTS 3,806,766  4/1974  Fanning ........................... 174/52 PE
3,838,316  9/1974  Brown et al. .................... 174/52 PE

FOREIGN PATENT DOCUMENTS 1299073  3/1970  Fed. Rep. of Germany .
1146381  3/1969  United Kingdom .

OTHER PUBLICATIONS

Siemens-Bauelemente, 2nd Ed., Apr. 1977, pp. 439-462.

*Primary Examiner*—J. V. Truhe
*Assistant Examiner*—D. A. Tone
*Attorney, Agent, or Firm*—Herbert L. Lerner; Laurence A. Greenberg

[57] ABSTRACT

An electrical component includes an electrical component member mounted centered and adjusted in a cup-shaped housing having a rectangular cross section, the housing having an opening through which lead wires from the electrical component member protrude in the same direction, and hardened sealing compound securing the electrical component member in the cup-shaped housing, the cup-shaped housing of rectangular cross section having at least on two opposite sides thereof, integrally formed tabs consisting of the same material as that of the cup-shaped housing, the tabs being bent into the interior of the cup-shaped housing and resiliently clamping the electrical component member in the housing, the tabs being encased in the hardened sealing compound and serving as centering and adjusting means for the electrical component member, the tabs having a V-shape and forming channels wherein the lead wires of the component member extend.

1 Claim, 4 Drawing Figures

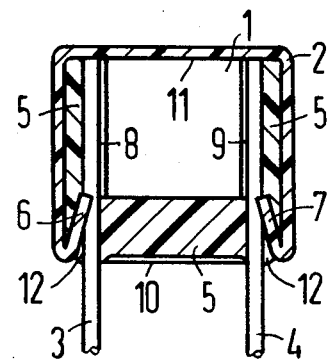
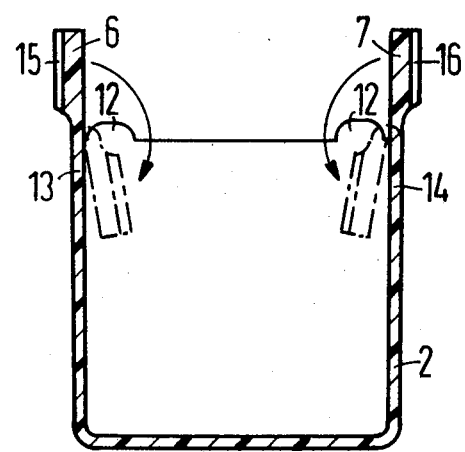
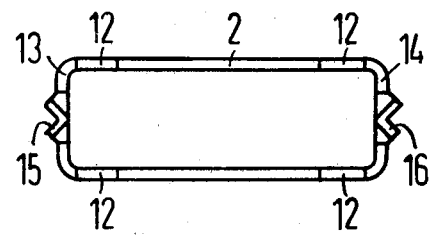
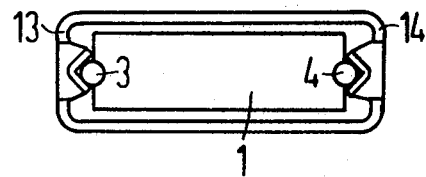

ELECTRICAL COMPONENT MEMBER WHICH IS MOUNTED IN A HOUSING CENTERED AND ADJUSTED

The invention relates to an electrical component and, more particularly, to such an electrical component which includes an electrical component member mounted centered and adjusted in a cup-shaped housing having a rectangular cross section, the housing having an opening through which lead wires from the electrical component member protrude in the same direction (axial wiring), and hardened sealing compound securing the electrical component member in the cup-shaped housing.

Such electrical components are described in the book "Siemens Bauelemente, Technische Erläuterungen und Kenndaten für Studierende". (Siemens Components, technical Explanations and Characteristic Data for Students), 2nd Ed., April 1977, on pages 439 to 462, especially on page 454, and are depicted on pages 455, 461 and 462.

In German Pat. No. 1,299,073, corresponding to British Pat. No. 1,146,381, there is described a method of installing in a cup-like housing an electric capacitor with end-face contact surfaces or a similar electrical component member provided with contact surfaces. In this method, the lead-in wires are passed through holes formed in the bottom of the cup-like housing until they protrude from the opening of the housing, after which the mechanical and electrical connection of the lead wires to the metal layers provided at the component member is effected, for example, by soldering. After the thus contacted component member is installed in the cup again, the latter is taken to a casting device wherein the empty space between the component member and the housing walls of the cup is cast full.

Electrical component members in the sense of the invention are primarily electric capacitors in the form of circular windings or of flat windings, or film capacitors (wherein the dielectrically effective layers are stacked alternatingly with metal layers ending on opposite sides), all of these capacitors being provided at opposite end faces with metal layers formed, for example, by metal spraying, in which lead wires are soldered or fastened by spot welding. These lead wires extend from the components in radial direction (axial wiring), so that these components can be accommodated in a housing in the form of a rectangular cup. Other component members are, for example, ceramic capacitors, electric resistors, coils and also semiconductor component members.

When such component members are mounted in a cup formed of insulating material, the connecting elements must be brought out radially at a defined spacing from one another (fixed grid pitch). Due to the different dimensions and the governing manufacturing tolerances of the component members, the requirement for a fixed grid pitch of the leads can be met only at very great expense, as is described, for example, in the cited German Pat. No. 1 299 073.

For portection against moisture and for securing the component member in the cup, the latter is cast full of sealing compound, for example, epoxy resins which are commercially available on a large scale, and this sealing compound is then hardened. These components members provided with leads, especially electric film capacitors, and then introduced into a preformed plastic cup which was previously filled with yet-liquid sealing compound, and is filled up with this sealing compound after the component member has been inserted. Since the sealing compound goes through a highly liquid phase during the hardening, there is danger that the electrical component member will change its position in the cup if it is not secured therein. It has become known heretofore to provide guide ribs at the inner wall of the cup for centering and adjusting the component member in the cup. Such guide ribs require, however, that the manufacturing tolerances of the electrical component member be very narrow.

Under certain conditions, clamping of the electrical component members has been realized by a special construction of the narrow side walls of the cup. Thus, for example, by a perpendicularly injection-molded guide tab in the cup at the upper edge of the narrow side walls, the guide tab having a profile providing a centering action, or by resilient lips injection-molded on and along the inner walls of the narrow side surfaces. These heretofore known securing aids, however, have the disadvantage that they are difficult to realize by injection molding, for example, because of the ensuring removal from the mold and, in addition, only small tolerances between the length of the component member and the inner length of the cup can be compensated resiliently.

It is an object of the invention to provide an electrical component in the manufacture of which the tolerances of the dimensions thereof may be greater than heretofore; which further retains the position thereof centered and adjusted in the cup until the sealing material has hardened; and with which both the injection molding operation of the cup as well as the mounting or installation of the electrical component member in the cup can be performed in a relatively simple manner.

Copending U.S. application Ser. No. 357,657, filed Mar. 12, 1982, assigned to the same assignee as that of the instant application, and now allowed, describes and claims an electrical component. of this general type, namely an electrical component comprising an electrical component member mounted centered and adjusted in a cup-shaped housing having a rectangular cross section, the housing having an opening through which lead wires from the electrical component member protrude in the same direction, and hardened sealing compound securing the electrical component member in the cup-shaped housing, the cup-shaped housing of rectangular cross section having, at least on two opposite sides thereof, integrally formed tabs consisting of the same material as that of the cup-shaped housing, the tabs being bent into the interior of the cup-shaped housing and resiliently clamping the electrical component member in the housing, the tabs being encased in the hardened sealing compound and serving as centering and adjusting means for the electrical component member.

Another feature of the aforementioned copending application is that the two opposite sides of the cup-shaped housing of rectangular cross section whereon the taps are integrally formed are the narrow sides of the rectangular cross section.

The cup-shaped housing is, for all practical purposes, part of the electrical component member, because through it the electrical properties of the component member are preserved, in that influences from the environment (moisture, aggressive gases and the like) are kept away.

The specific construction of the cup-shaped housing of the electrical component member ensures that the shortcomings and disadvantages encountered in the heretofore known constructions are avoided and, in addition, the above-mentioned problem is solved in a satisfactory manner.

The tabs can be provided there with V-shaped cut-outs, into which the lead wires of the component member are introduced. By bending such tabs into the interior of the cup, V-shaped forks are formed which ensure centering of the component in the direction of the width or breadth of the cup, while the centering of the component in longitudinal direction of the cup is accomplished by the two tabs.

It is also possible to arrange tabs integrally formed on the long sides of the cup or also on all four sides thereof.

The tabs may be provided on the outside thereof with raised guide strips which converge toward the end of the tabs, and between which the lead wires of the component member are guided. Also, this embodiment ensures centering of the component member in the direction of the width or breadth of the cup, besides centering in the longitudinal direction of the cup, which is accomplished by the bent tabs.

To assure, if required, a spacing between the component member and the bottom of the cup, so that the component does not come into direct contact with the inside of the cup and the empty space formed can be filled completely with sealing compound, the lead wires can extend beyond the component for a given length in direction towards the bottom of the cup.

It is an object of the invention of the instant application to further improve the centering and adjusting described in the aforementioned copending application and, at the same time, to simplify the manufacture of the cup-shaped housing.

With the foregoing and other objects in view, there is provided, in accordance with the invention, an electrical component including an electrical component member mounted centered and adjusted in a cup-shaped housing having a rectangular cross section, the housing having an opening through which lead wires from the electrical component member protrude in the same direction, and hardened sealing compound securing the electrical component member in the cup-shaped housing, the cup-shaped housing of rectangular cross section having, at least on two opposite sides thereof, integrally formed tabs consisting of the same material as that of the cup-shaped housing, the tabs being bent into the interior of the cup-shaped housing and resiliently clamping the electrical component member in the housing, the tabs being encased in the hardened sealing compound and serving as centering and adjusting means for the electrical component member, the tabs having a V-shape and forming channels wherein the lead wires of the component member extend.

While it has already been proposed in the aforementioned copending application to provide the tabs at the ends thereof with V-shaped cut-outs into which the lead wires of the component members are introduced, it has been found that guidance of the component member clearly parallel to the longitudinal walls during the insertion thereof into the cup is not ensured accurately enough thereby.

Something similar applies also to the possibility proposed in the aforementioned copending application to provide the tabs on the outside thereof with raised guide strips which converge toward the end of the tab and between which the lead wires of the component are guided.

In manufacturing such guide strips, additional cost is also necessary.

The invention of the instant application makes possible a parallel guidance of the component members over the entire insertion distance, as well as a simplified manufacture of the cup-shaped housing.

Other features which are considered as characteristic for the invention are set forth in the appended claims.

Although the invention is illustrated and described herein as embodied in an electrical component member which is mounted in a housing, centered and adjusted, it is nevertheless not intended to be limited in the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a cross-sectional view of an electrical component according to the invention;

FIG. 2 is an enlarged sectional view of a rectangular cup or cup-shaped housing with tabs integrally formed thereon;

FIG. 3 is a top plan view of FIG. 2 before the tabs are bent; and

FIG. 4 is a view similar to that of FIG. 3 after the tabs are bent and the component member is inserted.

In the figures, like parts are provided with the same reference characters.

Referring now to the drawing and first, particularly to FIG. 1 thereof, there is shown an electrical component member 1 which has metal layers 8 and 9 at the end faces thereof, and further provided with lead wires 3 and 4, which are fastened to the metal layers 8 and 9 preferably by soldering. The lead wires 3 and 4 protrude in the same direction from an opening 10 formed in the cup 2, in which the component member 1 is received. The void left between the cup 2 and the component member 1 with the lead wires 3 and 4 is filled with sealing compound 5 which is hardened. From the opening 10 and over the edge of the cup 2, tabs 6 and 7 are bent into the interior of the cup 2 and rest against the lead wires 3 and 4.

As shown in FIG. 1, the component member 1 rests against the bottom 11 of the cup 2. However, it is also possible that the lead wires extend beyond the component member 1 a given distance, so that a spacing of the component member 1 from the bottom 11 of the cup 2 is assured.

At the cup 2, conventional spacers 12 are provided, which are intended to hold the electrical component at a given distance from a printed circuit board when it is assembled thereon.

In FIGS. 2, 3 and 4, there is shown that the tabs 6 and 7 are integrally formed on the narrow sides 13 and 14 of the rectangular cup 2. These tabs 6 and 7 are V-shaped and form V-shaped channels 15 and 16 in this manner.

The two arrows in FIG. 2 indicate that the tabs 6 and 7 are bent into the interior of the cup 2. FIG. 3 is a top plan view of the cup before this bending operation, while FIG. 4 shows the cup after the bending operation and with the component member 1 inserted therein.

It has been found in practice that the cups 2 can be produced particularly simply with the invention of the instant application, and that the component member 1 is precisely centered in the cup in longitudinal as well as in transverse direction and is secured during the casing or molding with the sealing compound 5 and during the hardening thereof.

There is claimed:

1. An electrical component comprising an electrical component member mounted centered and adjusted in a cup-shaped housing having a rectangular cross section, said housing having an opening through which lead wires from the electrical component member protrude in the same direction, and hardened sealing compound securing the electrical component member in said cup-shaped housing, said cup-shaped housing being of rectangular cross section and having, at least on two opposite sides thereof, integrally formed tabs consisting of the same material as that of said cup-shaped housing, said tabs being bent into the interior of said cup-shaped housing and resiliently clamping the electrical component member in said housing, said tabs being encased in said hardened sealing compound and serving as centering and adjusting means for said electrical component member, said tabs having a V-shape and forming channels wherein said lead wires of said component member extend.

* * * * *